Patented Dec. 27, 1932

1,892,471

UNITED STATES PATENT OFFICE

HAROLD R. RAFTON, OF ANDOVER, MASSACHUSETTS, ASSIGNOR TO RAFFOLD PROCESS CORPORATION, A CORPORATION OF MASSACHUSETTS

MANUFACTURE OF PAPER

No Drawing. Application filed March 24, 1930. Serial No. 438,644.

My invention concerns a novel cycle in the manufacture of paper. It more particularly concerns a novel cycle in the manufacture of paper filled with alkaline filler.

The principal object of my invention is to provide a cycle whereby all the material passing on to the wire of a paper machine which is not made into paper is returned to the papermaking cycle under conditions favoring the minimizing of the time and/or intimacy of contact of such material with the other constituents of the mix.

An important object is to provide a cycle whereby the material recovered from the excess machine white waters is returned directly to the wet end of the paper machine.

A further object is to provide a method whereby the material from the couch chest is returned to the wet end of the paper machine.

A further object is to provide a method wherein the wet broke from the paper machine is returned to the wet end of the paper machine.

Other objects and advantages of this invention will become apparent during the course of the following description.

In various of my copending applications I have described methods for manufacturing paper filled with alkaline filler, both sized and unsized, wherein certain ingredients are added to the fibrous mix under conditions favoring the minimizing of the time and/or intimacy of contact of these ingredients with the constituents of the mix. These ingredients have included one or more of the following: alkaline filler, acidic material such as alum, size, precipitated sizing, sodium silicate, precipitated sodium silicate, and the like. These procedures have served various purposes, for instance for the elimination of foam, for prevention of lump formation, for sizing and the like.

In various of these copending applications I have also indicated the desirability in certain cases of returning the material recovered from the white waters to the fibrous mix under conditions favoring the minimizing of the time and/or intimacy of contact of the recovered material with the constituents of the fibrous mix. This cycle, although disclosed in various of the applications, has been claimed only in part. In the present application claim is made to hitherto unclaimed novel features thereof, and in addition certain further details of operating procedure are set forth.

The papermaking operation as it is customarily practiced, is substantially as follows:

An aqueous suspension of fibrous material is placed in a compounding or treating device such as a beater or the like together with such other materials as are desired to be used, such for instance as filler, size, for example rosin size, size precipitant, for example alum, tinting and the like. This mix usually has a dry solid content of approximately 5 per cent., more or less. The mix after subjection to sufficient treatment in the beater, is then ordinarily discharged into a container commonly called a "beater chest", additional water usually being added. Thereafter the mix is transferred from the beater chest to a suitable refining engine, usually a jordan, at a dry solid content which may be approximately in the neighborhood of 4 per cent. In common practice the mix is at this point usually diluted somewhat by the addition of water. The mix is then ordinarily conducted from the jordan to a second container commonly known as a "machine chest". From the machine chest the mix is transferred to a point near the web forming end of a paper machine where it is largely diluted with water, this point commonly being referred to as the mixing box, water being here added ordinarily in such an amount as to provide a dry content of approximately ½ to 1 per cent. or slightly higher, but usually not in excess of 1½ per cent. The mix in such highly dilute condition is then passed through rifflers or the like if desired and thereafter through screens and through the headbox of the paper machine on to the machine wire, or into a vat, depending upon whether a Fourdrinier or a cylinder machine is employed; and during this passage additional amounts of water are usually added in the form of sprays or otherwise.

This exact procedure is not always followed but in some instances is modified in accordance with the type of paper being made. For example, in the manufacture of certain types of paper the beating process is almost if not entirely dispensed with, the ingredients being merely mixed together prior to jordaning. In some instances the step of refining or jordaning may be partially if not wholly dispensed with. Moreover in some cases the arrangement of steps is different, for example the jordaning may take place subsequent to the machine chest, the stock passing directly from the jordan to the mixing box. Sometimes also the arrangement of the chests or the number of the chests used is varied. In general, however, it can be stated that in the papermaking process, regardless of the variations which may occur, the ingredients are normally mixed and/or treated in a relatively concentrated condition, and maintained therein for a substantial length of time, and then the mix is subsequently largely diluted preparatory to delivery to a web forming device and it remains in this dilute condition only a relatively brief period of time.

Inasmuch as not all the material delivered to the web forming device is immediately made into finished paper, owing to losses in the process, it will be apparent that some of this material is returned to the papermaking operation for reuse. The tray water or that part of the white water which is used at the mixing box to dilute the relatively concentrated stock has of course for a great many years been so reused immediately at the wet end of the paper machine, but the excess white water has normally been utilized as far as feasible earlier in the process such as in the beaters, chests, at the jordan, or the like; or when material contained therein was recovered therefrom such material has normally been added to the beater and/or chests. Other material such as the contents of the couch pit which normally consist of spillage from the machine and sometimes of spray water, as well as the trim from the wire and also all the material delivered from the wire in the case of a so-called "wet end" break, has also been returned earlier in the process, usually to one of the chests. Moreover the wet broke from the machine, that is, the broke from the paper web which has not yet been dried, is returned usually to the beaters, whereas the dry broke from the machine is customarily returned either to the beaters or to a special breaking engine from which it is sent either to the beaters or to one of the chests.

Most modern paper machines have apparatus functioning in conjunction therewith, for recovering the solids present in the excess white water, i. e. the white water not reused directly at the paper machine. This may be of any kind suitable for dewatering solids, for example it may consist of a sedimentation system, in which case the recovered solids are usually returned to the beater or the chests, or it may consist of a filtration or decker system, in which case the recovered solids may be returned to the beater, but are usually returned to one of the stock chests. One form of such filtration system uses a filter mat composed of the fibrous mix, as a means of filtering the white water. This filter mat is usually procured by taking a continuous stream of the fibrous mix (called "sweetener stock"), usually from the machine chest, mixing the same with the excess white water and then filtering the mixture on a continuous filter, thereby recovering substantially all the solids present in the excess white water. The filter mat now including the solids recovered from the excess white water is usually continuously returned to one of the chests, such as a machine chest, and the clarified water issuing from the filter may be used to as great an extent as desired in the papermaking cycle to replace fresh water which would otherwise have to be used.

It will be apparent that in furnishes containing alkaline filler, these practices of returning to an earlier concentrated stage where contact is maintained for a relatively long time that part of the material which was in the original furnish and which has passed through the highly dilute stage of the papermaking process but which has not been made into paper, results in contacting the various ingredients in this material with the alkaline filler for relatively long times and/or in a relatively concentrated condition. Under such circumstances, as has been explained in various of my copending applications, the alkaline filler acts to greatly deteriorate if not completely destroy certain desired effects in the paper mix, such as the effect of acidity conferred by the alum, the effect of sizing conferred by a size precipitate such as a rosin size-alum precipitate, and the like.

I have found, however, that if this material be returned to the fibrous mix under conditions favoring the minimizing of the time and/or intimacy of contact of this material with the ingredients of the fibrous mix, this deterioration or destruction of the desired effects by the presence of the alkaline filler is substantially lessened if not completely avoided.

In the preferred practice of my invention I return to the fibrous mix under conditions favoring the minimizing of the time and/or intimacy of contact substantially all the solids passing through the machine wire or web forming device, those drawn off from the various suction boxes, suction rolls, as well as those squeezed out at the press rolls and the like, also subtantially all the wet broke, and in addition substantially all the couch chest contents including the trim from the paper machine wire. In paper manufacture as hitherto practiced, it has been customary as indicated above to utilize directly for dilution at the mixing box or the like as much as possible of that part of the white water richest in solids, i. e. most of the tray waters. The excess white waters or the solids recovered therefrom were, as explained above, returned to other parts of the system. I do not necessarily change the utilization of the tray water at the mixing box as hitherto practiced, as this part of the system is usually left undisturbed. I give my attention particularly to the disposal of the material which occurs as waste in the paper machine operation as outlined above other than the tray water which is normally returned to the mixing box.

This material may be reintroduced into the fibrous mix at any time subsequent to the passage of the fibrous mix from the machine chest, as the time of contact of this material with the fibrous mix is thereby minimized. However as it is desirable also to have the intimacy of contact minimized, I prefer to reintroduce the material at the wet end of the paper machine, as under these conditions both the time and intimacy of contact are minimized. Hence the material is preferably introduced to the fibrous mix at the wet end of the paper machine, conveniently as the fibrous mix is being delivered into the mixing box. The material is introduced preferably continuously and preferably proportionately at this point. However any other convenient point at the wet end of the paper machine may be utilized as the point of addition.

If the machine be provided with a sedimentation system for handling the excess white water, the settlings from this sedimentation system may be fed in preferably continuously at this point. If the machine be provided with a deckering system for the excess white water which does not involve the use of sweetener stock for forming a filter mat, here again the deckered material may preferably be fed into the mixing box.

If the paper machine be equipped with a filter type save-all operated on sweetener stock for handling the excess white water, several methods of operation are feasible.

As stated above, the papermaking apparatus may be arranged so that the machine chest delivers directly into the mixing box, or the jordan may be interposed between the machine chest and the mixing box. In the first arrangement the sweetener stock may be drawn either directly from the machine chest or, what amounts to the same thing, from the pipe delivering the fibrous mix from the machine chest to the mixing box. The sweetener stock may then be mixed with the excess white water from the paper machine, run through the filter, and the filtered mat containing substantially all the solids from the excess white water, may be introduced either into the stream of the concentrated fibrous mix just before it reaches the mixing box or directly at the mixing box. It is apparent under these conditions that what is done practically is to divert part of the fibrous mix, which would ordinarily go directly into the mixing box, to act as a mat in the filtering operation and then recombine this mat with the original stream of the fibrous mix going to the mixing box. As the filtered mat is usually more concentrated than the mix from which it was derived, it is advisable to dilute it to approximately the same concentration preferably with white water prior to reintroducing it into the main stream of the fibrous mix or into the mixing box.

In the case where the jordan is located between the machine chest and the mixing box, the sweetener stock may be drawn as before directly from the machine chest or from the stream of the fibrous mix as it flows from the machine chest to the jordan; or it may be drawn from the stream of the fibrous mix issuing from the jordan before it enters the mixing box. In the first instance the filtered mat will be of unjordaned fibre. In the second instance it will be of jordaned fibre. In the first instance it is desirable to reintroduce the sweetener stock which has acted as a filter mat back into the stream of the fibrous mix going to the jordan, but this is not in all cases necessary, although if the filter mat be introduced beyond the jordan, it is obvious that part of the fibrous mix going to the machine will be in the unjordaned condition. In the second instance the sweetener stock may be reintroduced at the mixing box.

As will be apparent, filtration with a mat of jordaned stock is somewhat more difficult than with a mat of unjordaned stock, as the filtration is slower. However, a thinner mat of jordaned stock may be successfully employed, thereby substantially equalizing the time of filtration required by the jordaned stock with that which would be required with the unjordaned stock.

Another method of providing sweetener stock, particularly if old paper stock or other material such as broke which has already been jordaned in its original process of manufacture is a part of the furnish, is to keep such stock in a separate system and use it for the sweetener stock which is added at the mixing box after being so utilized. This is advantageous in certain instances in effecting economy by relieving the jordan from treating stock which does not require treating. It is thus apparent that when I speak of mixing excess white water with a portion of relatively concentrated fibrous mix (i. e. as sweetener stock), I may mean either that the portion has been taken from the original fibrous mix, or that it is a portion of fibrous material prepared separately as just described: In either case the portion after functioning as sweetener stock is subsequently combined with the remainder of the fibrous mix.

In handling the wet broke, it is desirable that this be fed into the mixing box by diluting in an appropriate agitating device with part of the excess machine white water, or it may be fed continuously in fairly concentrated condition to the mixing box, where the vigorous agitation the mix receives at this point will effect its complete disintegration.

As will be apparent it is desirable in practicing my invention to have as small a trim on the paper machine as possible in order not to return too great a proportion of the stock going over the wire to the wet end of the paper machine.

Inasmuch as in ordinary practice the wet broke from the machine is not returned continuously to the paper furnish, and inasmuch as the contents of the couch pit are sometimes not returned continuously into the fibrous mix, I have found it at times desirable to employ my process only for the reintroduction to the fibrous mix of the material recovered from the excess white water. The other wet wastes are returned to the papermaking cycle as hitherto. While this is not so advantageous in some cases as returning all of the waste materials as described, nevertheless it has certain practical advantages. This is especially so in the manufacture of certain grades of paper where wet end breaks may occur more frequently than in other grades, in that a wet end break does not act then to throw so much fibrous material back into the mixing box as to modify the weight of the sheet greatly when proper control devices are not in use.

When utilizing my process only on the material from the excess white water, although the alkaline filler is not kept entirely out of the early part of the paper-making operation, it is kept out to a very considerable extent, especially if my process be conducted in connection with the processes disclosed in various of my copending applications having to do with the addition of alkaline filler at the wet end of the paper machine.

As will be apparent, my invention may be carried out by itself, or advantageously in connection with the addition of one or more of the folowing materials at the wet end of the paper machine: alkaline filler, acidic material such as alum, size, precipitated sizing, sodium silicate, precipitated sodium silicate, and the like. It is obvious that my invention is applicable to the manufacture of either sized or unsized paper filled with alkaline filler.

I have found it desirable in the practice of my invention to utilize adequate stock control devices in order that the actual amount of material fed into the mixing box may be held as closely constant as possible. I have found it also desirable to apply this control to the various liquid streams, whether of water, or diluted or concentrated stock, which eventually find their way into the mixing box of the paper machine.

By the term "alkaline filler" I mean substantially water insoluble filler which when agitated in contact with freshly boiled distilled water, say for an hour, will impart a pH value to such water greater than 7.0, that is, which will be on the alkaline side of the neutral point. Among fillers included in this group may be mentioned calcium carbonate, of which lime mud from the causticizing process is one form; calcium carbonate magnesium basic carbonate employed in the paper disclosed in my U. S. Patent No. 1,595,416, dated August 10, 1926; calcium carbonate magnesium hydroxide disclosed in my U. S. Patent No. 1,415,391, dated May 9, 1922; and other substantially water insoluble normal or basic carbonates of alkaline earth metals, (which expression is herein intended to include magnesium), or compounds, double salts, or physically associated mixtures of these with one or more other acid soluble materials of a substantially water insoluble nature.

By the term "alkaline filler" I also intend to include fibrous material or the like containing one or more compounds of the character referred to, such as "old papers" or similar papers, "broke", or the like.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

By the term "wet end of the paper machine", I intend to include those instrumentalities employed in paper manufacture by which and/or in which a relatively concentrated paper mix is diluted, and treated, conveyed or fed up to the point of web-formation such as the mixing box, regulating and proportioning devices, rifflers, troughs and screens, and head boxes, inlets and the like, including also instrumentalities used in the white water cycle.

While I have described in detail the preferred embodiment of my invention, it is to be understood that the details of procedure, the proportions of ingredients, and the arrangement of steps may be widely varied without departing from the spirit of my invention or the scope of the subjoined claims.

I claim:

1. In a process of manufacturing paper filled with alkaline filler, wherein both alkaline filler and material capable of deterioration by alkaline filler are employed, the cyclic procedure comprising the returning of substantially all the solids which are delivered to the web forming device but which do not pass through the driers, to the fibrous mix under conditions favoring the minimizing of the time of contact of said solids with the constituents of the mix.

2. In a process of manufacturing paper filled with alkaline filler, wherein both alkaline filler and material capable of deterioration by alkaline filler are employed, the cyclic procedure comprising the returning of substantially all the solids which are delivered to the web forming device but which do not pass through the driers, to the fibrous mix under conditions favoring the minimizing of the time and intimacy of contact of said solids with the constituents of the mix.

3. In a process of manufacturing paper filled with alkaline filler, wherein both alkaline filler and material capable of deterioration by alkaline filler are employed, the cyclic procedure comprising the returning of substantially all the solids which are delivered to the web forming device but which do not pass through the driers, to the fibrous mix subsequent to the passage of the mix from the machine chest.

4. In a process of manufacturing paper filled with alkaline filler, wherein both alkaline filler and material capable of deterioration by alkaline filler are employed, the cyclic procedure comprising the returning of substantially all the solids which are delivered to the web forming device but which do not pass through the driers, to the fibrous mix at the wet end of the paper machine.

5. The cyclic procedure in the process of manufacturing paper filled with alkaline filler comprising the returning of material recovered from excess white water of the paper machine together with acidic material to the fibrous mix under conditions favoring the minimizing of the time of contact of said material with the constituents of the mix.

6. The cyclic procedure in the process of manufacturing paper filled with alkaline filler comprising the returning of material recovered from excess white water from the paper machine together with acidic material to the fibrous mix under conditions favoring the minimizing of the time and intimacy of contact of said material with the constituents of the mix.

7. The cyclic procedure in the process of manufacturing paper filled with alkaline filler comprising the returning of material recovered from excess white water from the paper machine together with acidic material to the fibrous mix at the wet end of the paper machine.

8. The cyclic procedure in the process of manufacturing paper filled with alkaline filler comprising mixing excess white water from the paper machine with a portion of relatively concentrated fibrous mix, dewatering the mixture, and combining the dewatered solids together with acidic material with the remainder of the fibrous mix under conditions favoring the minimizing of the time of contact between the so returned solids and the fibrous mix.

9. The cyclic procedure in the process of manufacturing paper filled with alkaline filler comprising mixing excess white water from the paper machine with a portion of relatively concentrated fibrous mix, filtering the mixture, and combining the filtered solids together with acidic material with the remainder of the fibrous mix at the wet end of the paper machine.

10. The cyclic procedure in the process of manufacturing paper filled with alkaline filler comprising mixing excess white water from the paper machine with a portion of relatively concentrated fibrous mix, dewatering the mixture, and combining the dewatered solids and acidic material with the remainder of the fibrous mix at the wet end of the paper machine.

11. The cyclic procedure in the process of manufacturing paper filled with alkaline filler comprising mixing excess white water from the paper machine with a portion of relatively concentrated fibrous mix, dewatering the mixture, and combining the dewatered solids and alum with the remainder of the fibrous mix at the wet end of the paper machine.

12. The method of manufacturing paper filled with alkaline filler, comprising mixing fibrous material and alkaline filler in the beater, subsequently dividing the fibrous mix into two portions, mixing one portion thereof with excess white water and then dewatering the mixture, combining the dewatered portion containing solids derived from said excess white water with the other portion of the fibrous mix and acidic material under conditions favoring the minimizing of the time of contact, passing the combined mix on to a web forming device, forming a web thereon, returning excess white water passing through said web forming device cyclically to be mixed as aforesaid with a portion of the fibrous mix, and drying said web.

13. The method of manufacturing paper filled with alkaline filler, comprising mixing fibrous material and alkaline filler in the beater, subsequently dividing the fibrous mix into two portions, mixing one portion thereof with excess white water and then dewatering the mixture, combining the dewatered portion containing solids derived from said excess white water with the other portion of the fibrous mix and acidic material under conditions favoring the minimizing of the time and intimacy of contact, passing the combined mix on to a web forming device, forming a web thereon, returning excess white water passing through said web forming device cyclically to be mixed as aforesaid with a portion of the fibrous mix, and drying said web.

14. The method of manufacturing paper filled with alkaline filler, comprising mixing fibrous material and alkaline filler in the beater, subsequently dividing the fibrous mix into two portions, mixing one portion thereof with excess white water and then dewatering the mixture, combining the dewatered portion containing solids derived from said excess white water with the other portion of the fibrous mix and acidic material at the wet end of the paper machine, passing the combined mix on to a web forming device, forming a web thereon, returning excess white water passing through said web forming device cyclically to be mixed as aforesaid with a portion of the fibrous mix, and drying said web.

15. In a process of manufacturing paper filled with alkaline filler, wherein both alkaline filler and material capable of deterioration by alkaline filler are employed, and wherein two separately prepared mixes of fibrous material are combined at the wet end of the paper machine, the steps comprising the filtration of the excess white water, coming from a paper machine running on paper filled with alkaline filler, with the aid of sweetener stock derived from one of said mixes, previously made paper being present in the fibrous material of said mix, and the combining of the solids of the so-produced filter mat with the other mix at the wet end of the paper machine.

16. In a process of manufacturing paper filled with alkaline filler, wherein both alkaline filler and material capable of deterioration by alkaline filler are employed, and wherein two separately prepared mixes of fibrous material are combined at the wet end of the paper machine, the steps comprising the filtration of the excess white water, coming from a paper machine running on paper filled with alkaline filler, with the aid of sweetener stock derived from one of said mixes, old paper stock being present in the fibrous material of said mix, and the combining of the solids of the so-produced filter mat with the other mix at the wet end of the paper machine.

17. In a process of manufacturing paper filled with alkaline filler, wherein both alkaline filler and material capable of deterioration by alkaline filler are employed, and wherein two separately prepared mixes of fibrous material are combined at the wet end of the paper machine, the steps comprising the filtration of the excess white water, coming from a paper machine running on paper filled with alkaline filler, with the aid of sweetener stock derived from one of said mixes, said mix including fibrous material which has been jordanned in a previous paper making operation, and the combining of the solids of the so-produced filter mat with the other mix at the wet end of the paper machine.

In testimony whereof I affix my signature.

HAROLD ROBERT RAFTON.